US009434418B2

(12) United States Patent
Townson et al.

(10) Patent No.: US 9,434,418 B2
(45) Date of Patent: *Sep. 6, 2016

(54) HOOD ASSEMBLY FOR A VEHICLE AND METHOD OF ALIGNING FRONT END ASSEMBLY COMPONENTS FOR A VEHICLE

(71) Applicant: GM GLOBAL TECHNOLOGY OPERATIONS LLC, Detroit, MI (US)

(72) Inventors: James M. Townson, Clarkson, MI (US); Derek L. Patterson, Shelby Township, MI (US); Robert T. Gazda, Washington, MI (US); Mark L. Felzien, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/491,411

(22) Filed: Sep. 19, 2014

(65) Prior Publication Data
US 2015/0008705 A1 Jan. 8, 2015

Related U.S. Application Data

(63) Continuation of application No. 13/735,331, filed on Jan. 7, 2013, now Pat. No. 8,845,010.

(60) Provisional application No. 61/697,102, filed on Sep. 5, 2012.

(51) Int. Cl.
*B62D 25/08* (2006.01)
*B62D 25/12* (2006.01)
(Continued)

(52) U.S. Cl.
CPC ............ *B62D 25/12* (2013.01); *B62D 25/084* (2013.01); *B62D 25/105* (2013.01); *B62D 65/06* (2013.01); *G01B 5/24* (2013.01); *G01B 5/25* (2013.01); *Y10T 29/49622* (2015.01)

(58) Field of Classification Search
CPC ... B62D 25/084; B62D 25/085; B62D 25/12
USPC ............ 296/193.11, 193.09, 203.02, 187.09; 29/897.2; 180/69.21
See application file for complete search history.

(56) References Cited

U.S. PATENT DOCUMENTS 6,196,624 B1   3/2001   Bierjon et al.
7,967,373 B2   6/2011   Ritz
(Continued)

FOREIGN PATENT DOCUMENTS

CN   101020441 A   8/2007
CN   101939209 A   1/2011
(Continued)

OTHER PUBLICATIONS

Office Action regarding related CN Application No. 201310399474.3; dated Jul. 23, 2015; 7 pgs.

*Primary Examiner* — Joseph D Pape
(74) *Attorney, Agent, or Firm* — Cantor Colburn LLP

(57) ABSTRACT

A hood assembly for a vehicle includes a hood having a top side and an underside. Also included is a centering tool operatively coupled to a top support member of a positioning and reinforcement structure, the centering tool extending upwardly from the positioning and reinforcement structure. Further included is a hood locating aperture defined by the hood and located at the underside of the hood, the hood locating aperture configured to receive the centering tool therein for locating the positioning and reinforcement structure to the hood.

15 Claims, 13 Drawing Sheets

| (51) | Int. Cl. | | 8,308,225 B2 | 11/2012 | Owen et al. |
|---|---|---|---|---|---|
| | *G01B 5/24* | (2006.01) | 8,567,853 B2 | 10/2013 | Huber et al. |
| | *B62D 25/10* | (2006.01) | 8,845,010 B2 | 9/2014 | Townson et al. |
| | *B62D 65/06* | (2006.01) | 2008/0290692 A1 | 11/2008 | Boggess |
| | *G01B 5/25* | (2006.01) | | | |

(56) References Cited

U.S. PATENT DOCUMENTS 8,162,387 B1  4/2012  Nydam et al.

FOREIGN PATENT DOCUMENTS

| CN | 201800791 U | 4/2011 |
|---|---|---|
| JP | H08268356 A | 10/1996 |
| JP | H08276877 A | 10/1996 |

HOOD ASSEMBLY FOR A VEHICLE AND METHOD OF ALIGNING FRONT END ASSEMBLY COMPONENTS FOR A VEHICLE

CROSS-REFERENCE TO RELATED APPLICATION

This application claims the benefit of U.S. patent application Ser. No. 13/735,331, now U.S. Publication 2014/0062141, filed Jan. 7, 2013, which claims the benefit of Provisional Application Ser. No. 61/697,102 filed Sep. 5, 2012, the contents of which are hereby incorporated herein by reference in their entirety.

FIELD OF THE INVENTION

The subject invention relates to vehicles, and more particularly to a hood assembly, as well as a method of aligning front end assembly components for such vehicles.

BACKGROUND

Vehicles, such as automobiles, are assembled by aligning and fastening numerous components and sub-assemblies to one another. One region of the automobile requiring assembly of such components and sub-assemblies is a front end region, sometimes referred to as a "front clip." The front clip is commonly defined as the region of the vehicle extending from the A-pillar to the most forwardly disposed component, typically a front bumper. The front clip includes a structural frame, as well as a variety of components that collectively form a body.

Several efforts to directly or indirectly mount and/or fix the body components to each other, as well as to the frame have included several approaches which rely on machined body mounting locations for the body components. Approaches relying on such body mounting locations have undesirably led to large variations in alignment and fastening of components to each other. Numerous issues related to large variations may influence the aesthetic appearance of the automobile and may be the cause of functional deficiencies, such as opening/closing efforts, alignment and mutilation, to name a few, which each may affect consumer satisfaction.

SUMMARY OF THE INVENTION

In one exemplary embodiment of the invention, a hood assembly for a vehicle includes a hood having a top side and an underside. Also included is a centering tool operatively coupled to a top support member of a positioning and reinforcement structure, the centering tool extending upwardly from the positioning and reinforcement structure. Further included is a hood locating aperture defined by the hood and located at the underside of the hood, the hood locating aperture configured to receive the centering tool therein for locating the positioning and reinforcement structure to the hood.

In another exemplary embodiment of the invention, a method of aligning a plurality of front end assembly components for a vehicle is provided. The method includes operatively coupling a centering tool to a top support member of a positioning and reinforcement structure to orient the centering tool in an upwardly disposed manner. The method also includes pivoting a hood downwardly to bring a hood locating aperture proximate the centering tool, wherein the hood locating aperture is defined by an inner panel of the hood at an underside of the hood. The method further includes aligning the hood locating aperture with the upwardly extending centering tool. The method yet further includes pivoting the hood further downwardly to insert the centering tool into the hood locating aperture for fixing the positioning and reinforcement structure in a cross-car direction.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
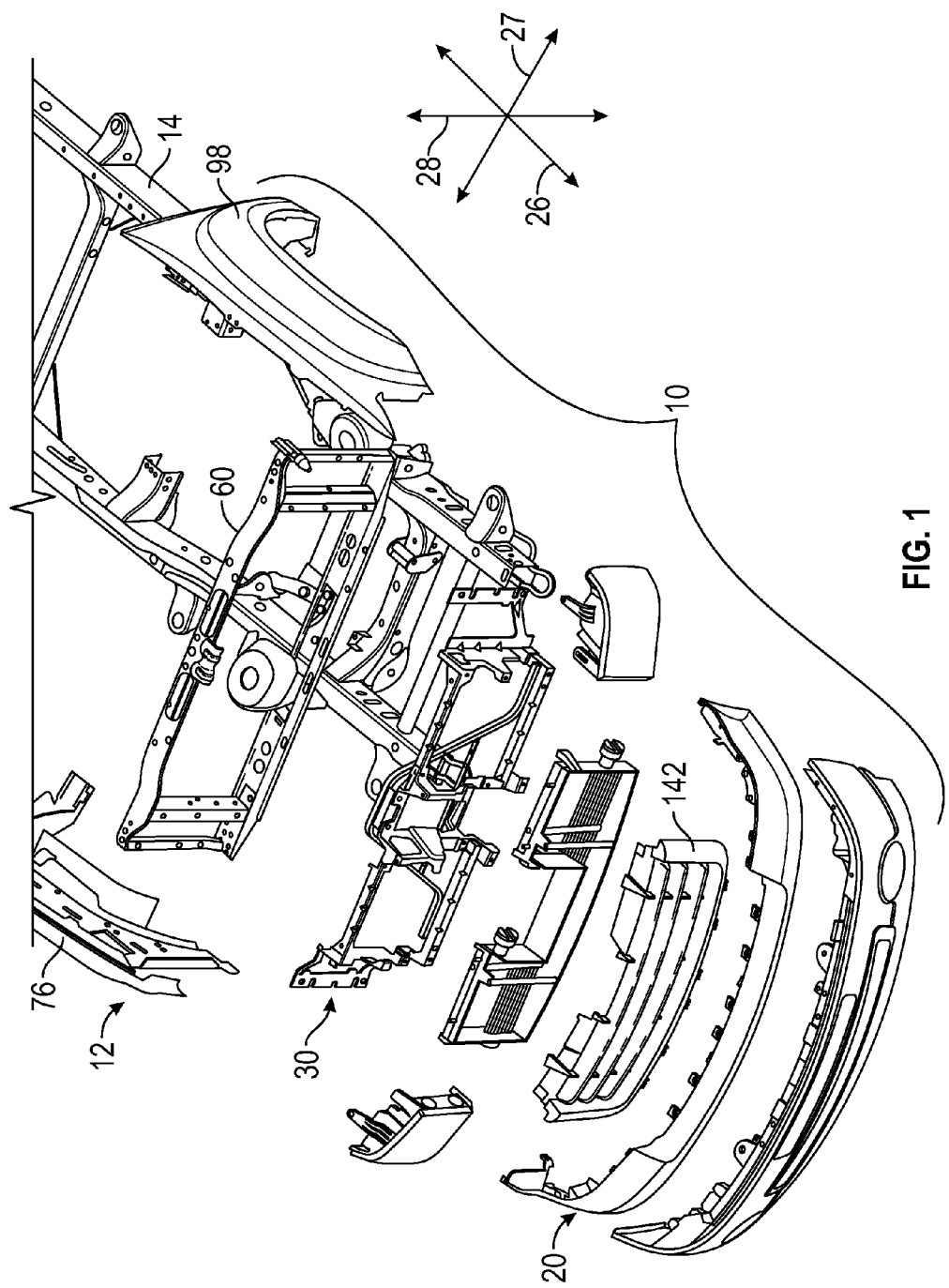
FIG. 1 is a simplified, partially disassembled view of a front end assembly of a vehicle.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending from what is commonly referred to as an "A-pillar" to a forwardly disposed component, such as a bumper 20 for the vehicle 12. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. The positioning and reinforcement structure 30 also provides structural support for the attached components. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as positioning and reinforcement assembly 30 or GOR assembly. As will be described in detail below, the positioning and reinforcement structure 30 includes locators, fastening features, and other critical dimensional relationship interfaces of several components and sub-assemblies. Such components and sub-assemblies typically include fender assemblies, headlamps, grills, fascias, bumpers and bumper attachment features, hoods and under-hood closeout panels, air baffles and radiator supports, for example. It is to be understood that the preceding list is merely illustrative of the numerous components and sub-assemblies which may be included in the front end assembly 10 and may benefit from the positioning and reinforcement structure 30. Exemplary components and sub-assemblies will be described in detail below. As used herein, an axial direction, or a fore-aft direction 26 refers to a direction that extends frontward and rearward along an axis of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 2:
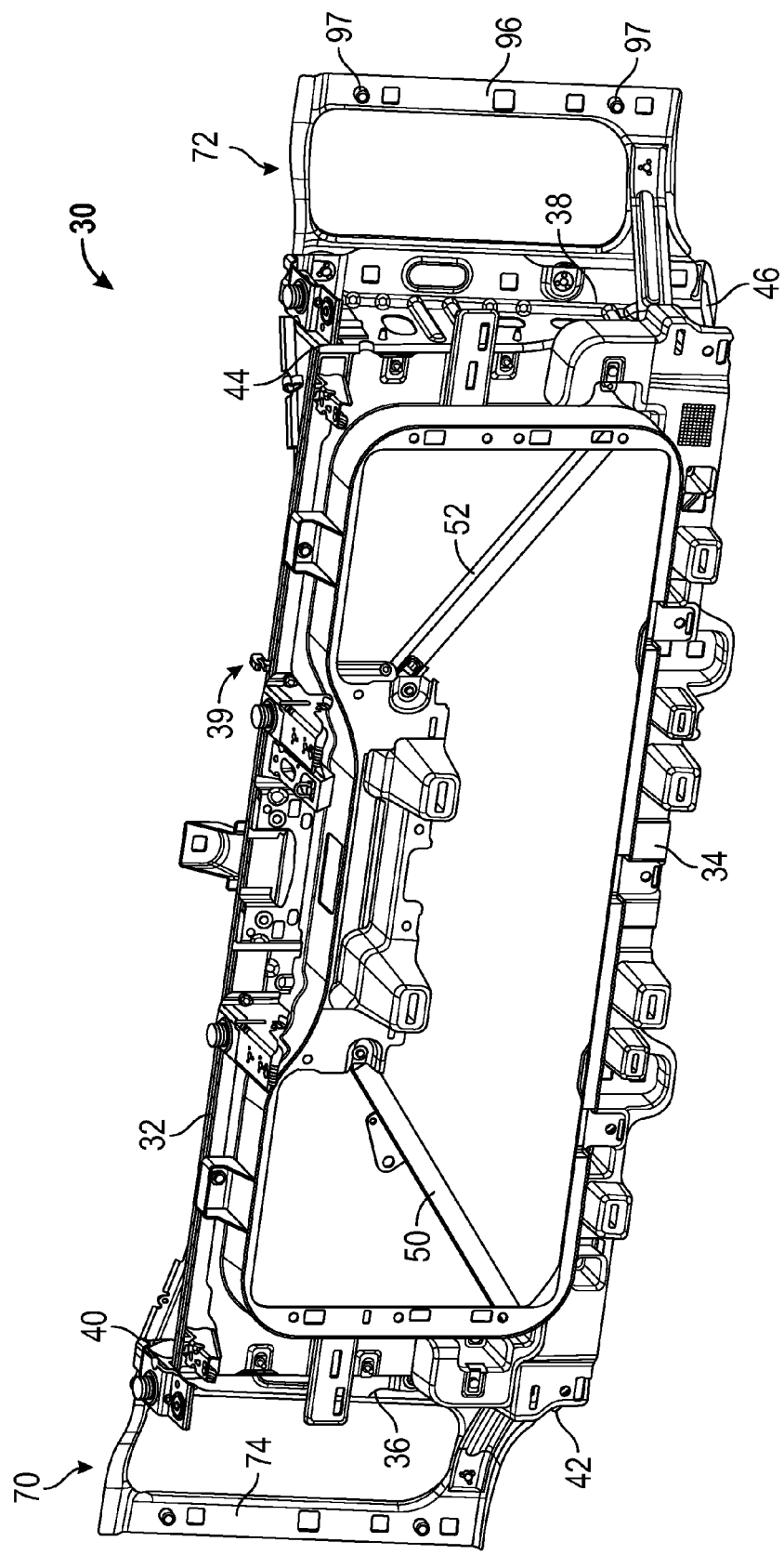
FIG. 2 is a perspective view of a positioning and reinforcement structure of the front end assembly.
Figure 3:
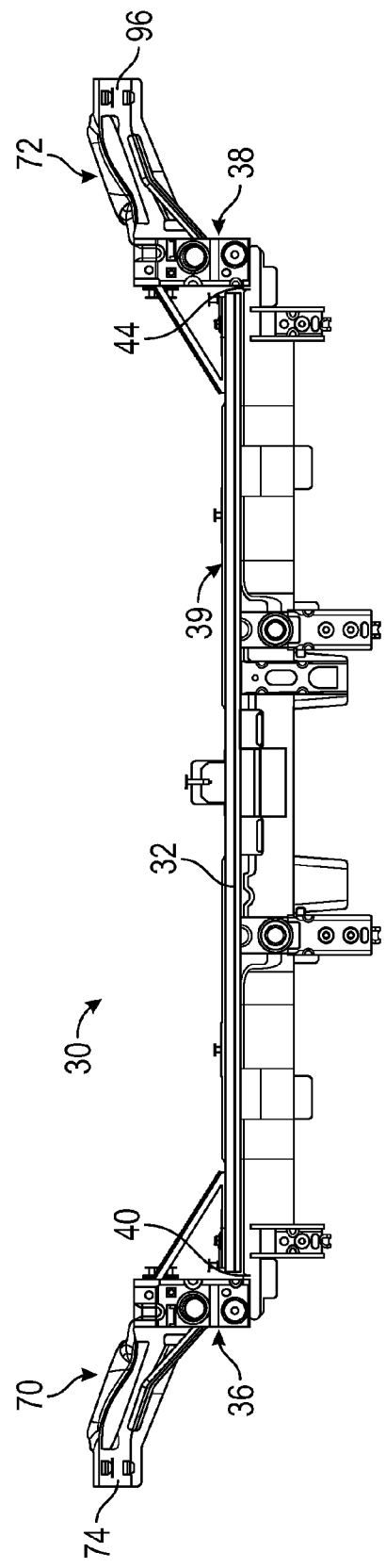
FIG. 3 is a top plan view of the positioning and reinforcement structure.

Referring now to FIGS. 2 and 3, in conjunction with FIG. 1, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in the cross-car direction 27 and relatively parallel to each other. The first side member 36 and the second side member 38 extend relatively parallel to each other, but in the relatively vertical direction 28. As may be understood the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement structure 30, such as by casting, molding, or welding process, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Figure 4:
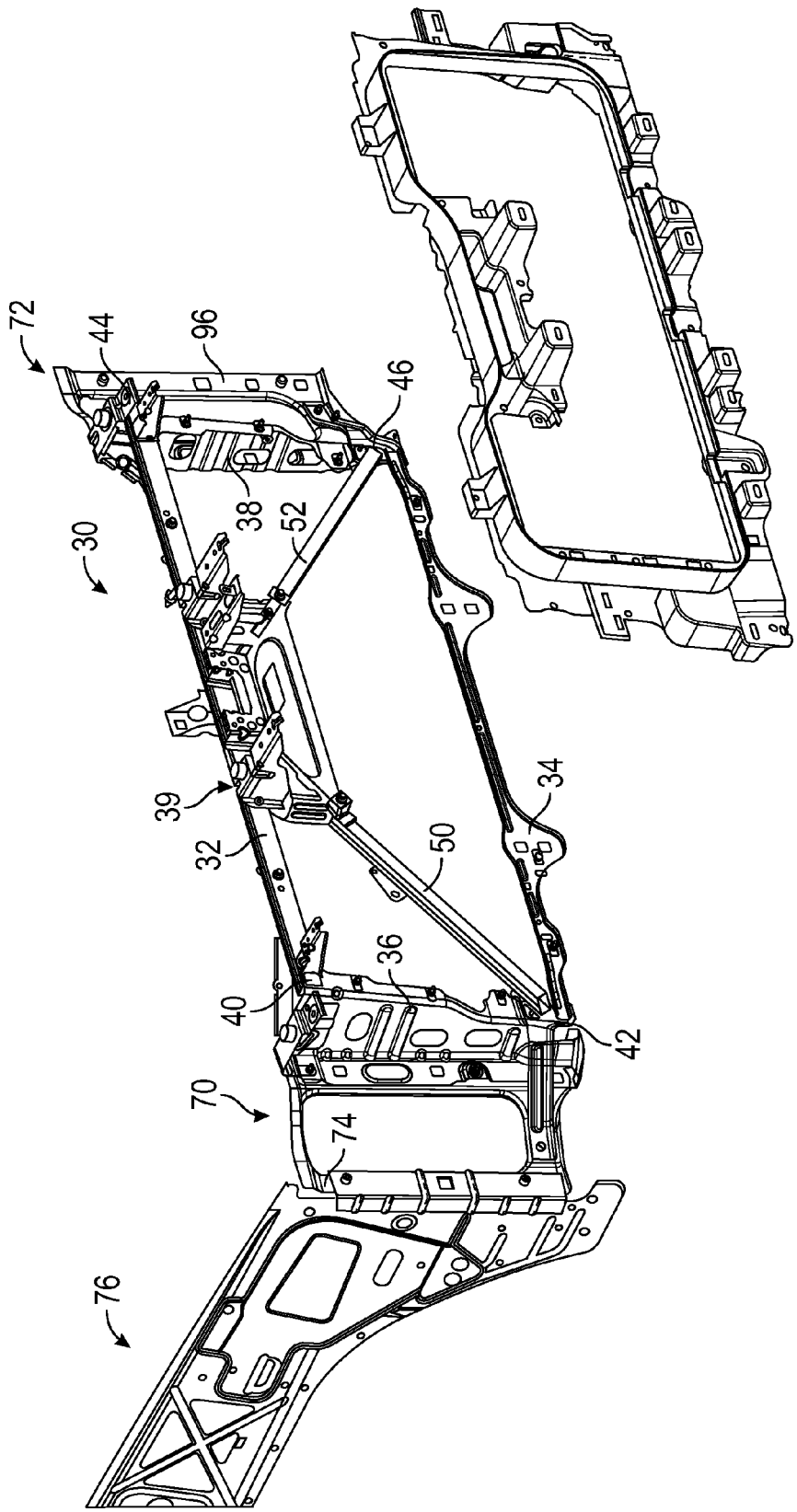
FIG. 4 is a partially disassembled view of the positioning and reinforcement structure.
Figure 5:
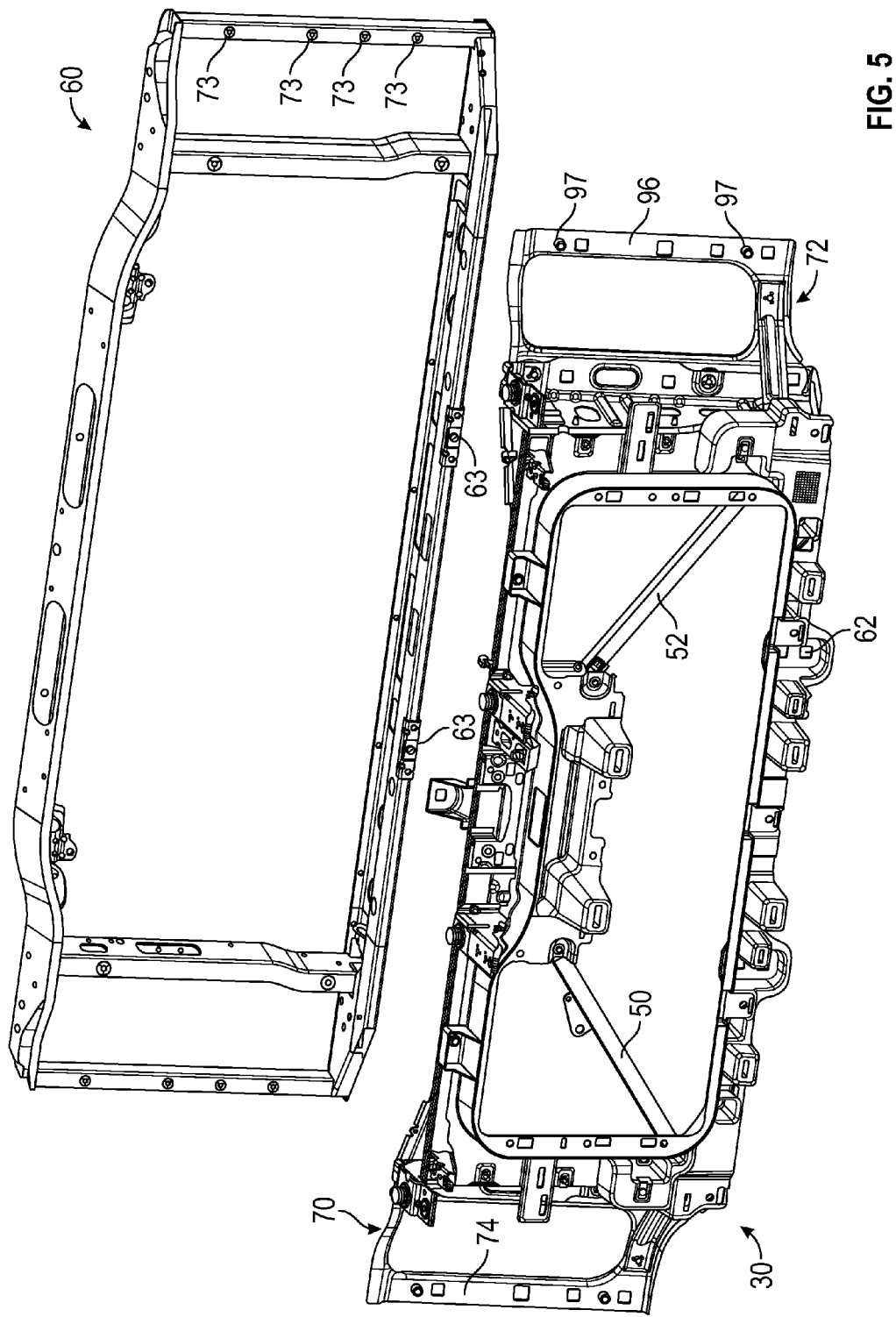
FIG. 5 is a perspective view of a radiator support prior to operable coupling with the positioning and reinforcement structure.
Figure 6:
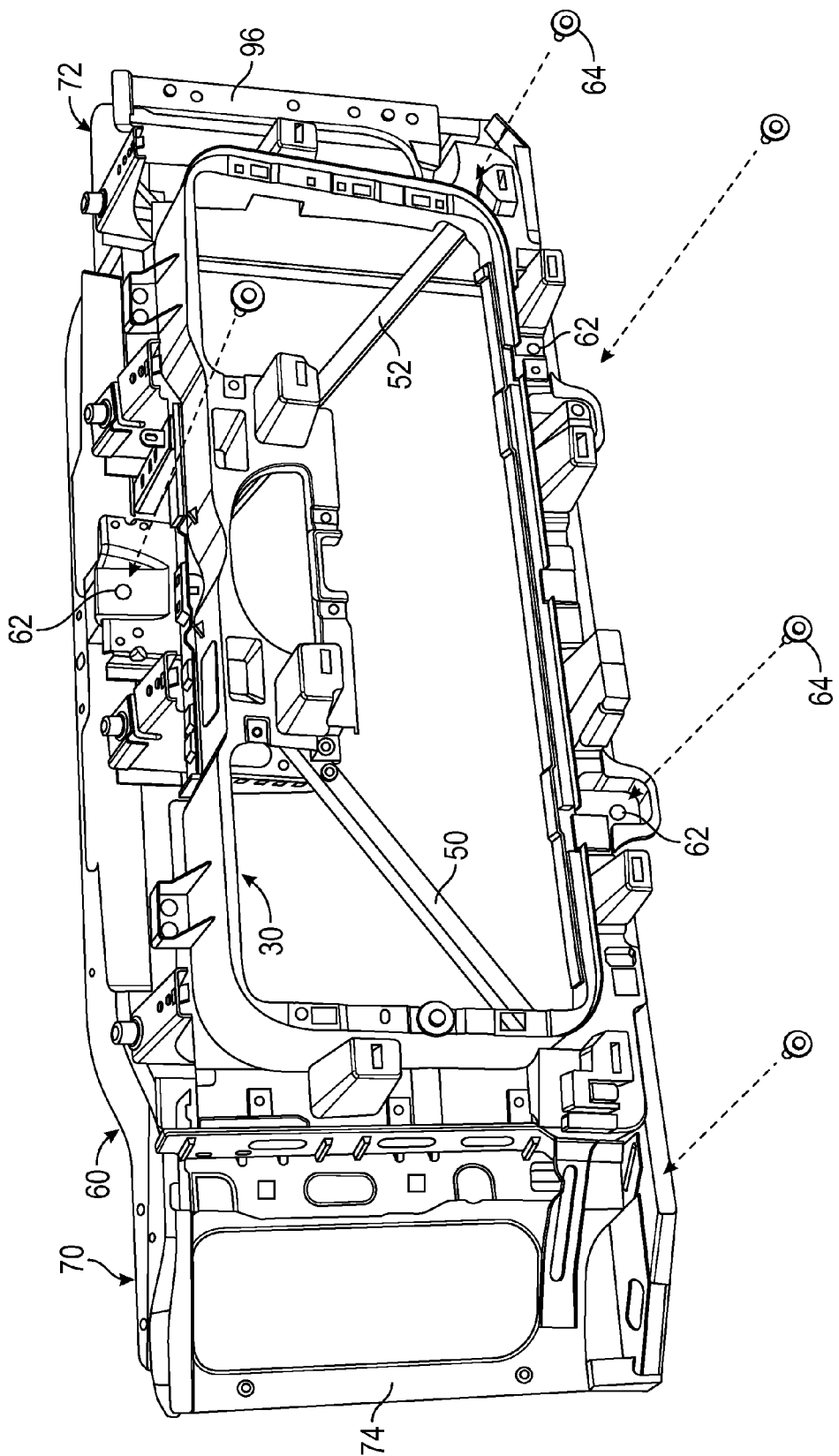
FIG. 6 is a perspective view of the radiator support and the positioning and reinforcement structure operably coupled.

Referring now to FIGS. 4-6, a radiator support 60 is configured to operably couple to an aft portion of the positioning and reinforcement structure 30. A plurality of apertures 62 are disposed in numerous locations along the positioning and reinforcement structure 30 that correspond to receiving structures disposed within a front face of the radiator support 60. A plurality of mechanical fasteners 64 are employed and extend through the plurality of apertures 62 into the receiving structures of the radiator support 60 to fixedly retain the positioning and reinforcement structure 30 to the radiator support 60. It is to be appreciated that although the positioning and reinforcement structure 30 and the radiator support 60 are ultimately disposed in a fixed relationship to each other, a loose fitting relationship between the positioning and reinforcement structure 30 and the radiator support 60 is employed during several assembly phases of the front end assembly 10. This is achieved by partially installing mechanical threaded fasteners. Specifically, while the radiator support 60 is fixedly secured to the frame 14, the positioning and reinforcement structure 30 has at least one degree of freedom with respect to displacement relative to the radiator support 60. Such a relationship allows the positioning and reinforcement structure 30 to move during mounting of other components to the positioning and reinforcement structure 30. The tight, fixed relationship between the positioning and reinforcement structure 30 and the radiator support 60 is not established until various other components of the front end assembly 10 are properly located and mounted, as will be described in detail below.

Figure 7:
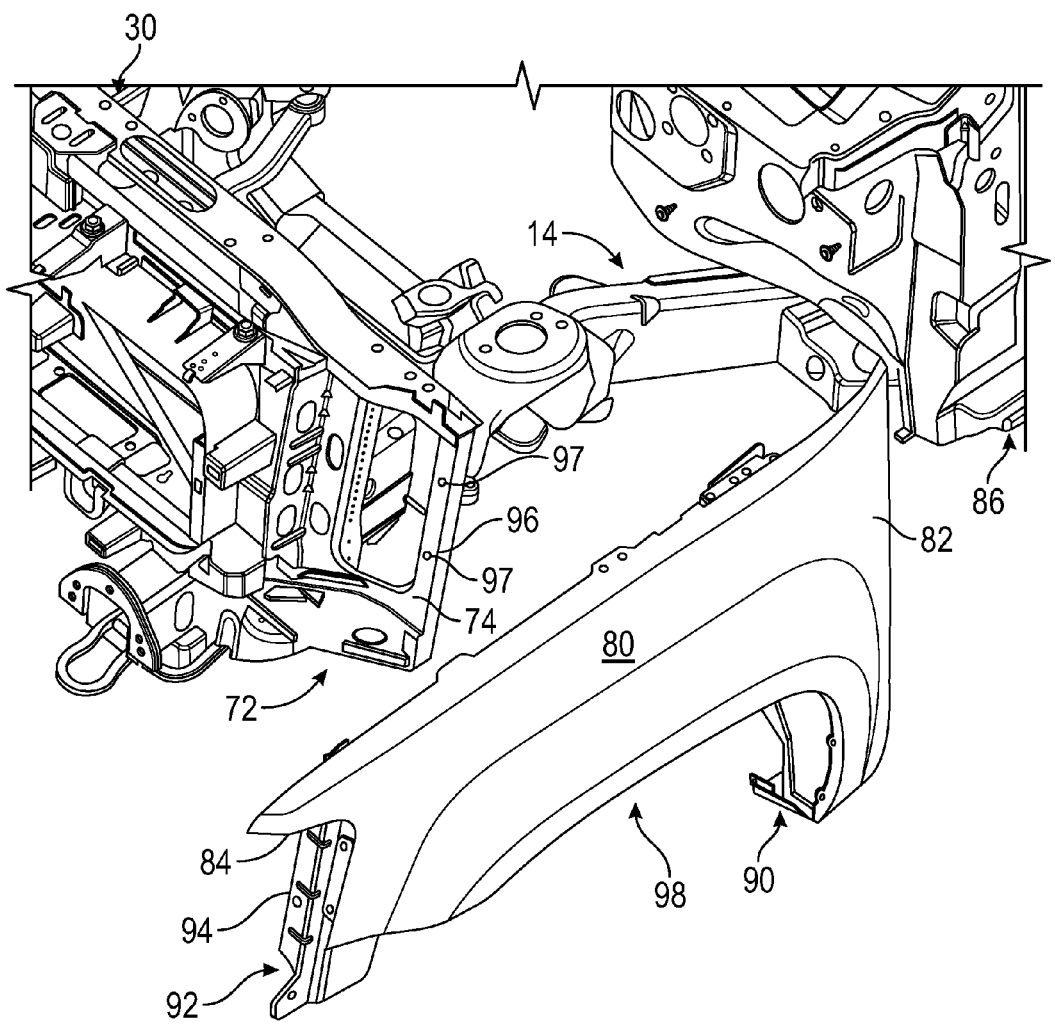
FIG. 7 is a top, front perspective view of the fender assembly.
Figure 8:
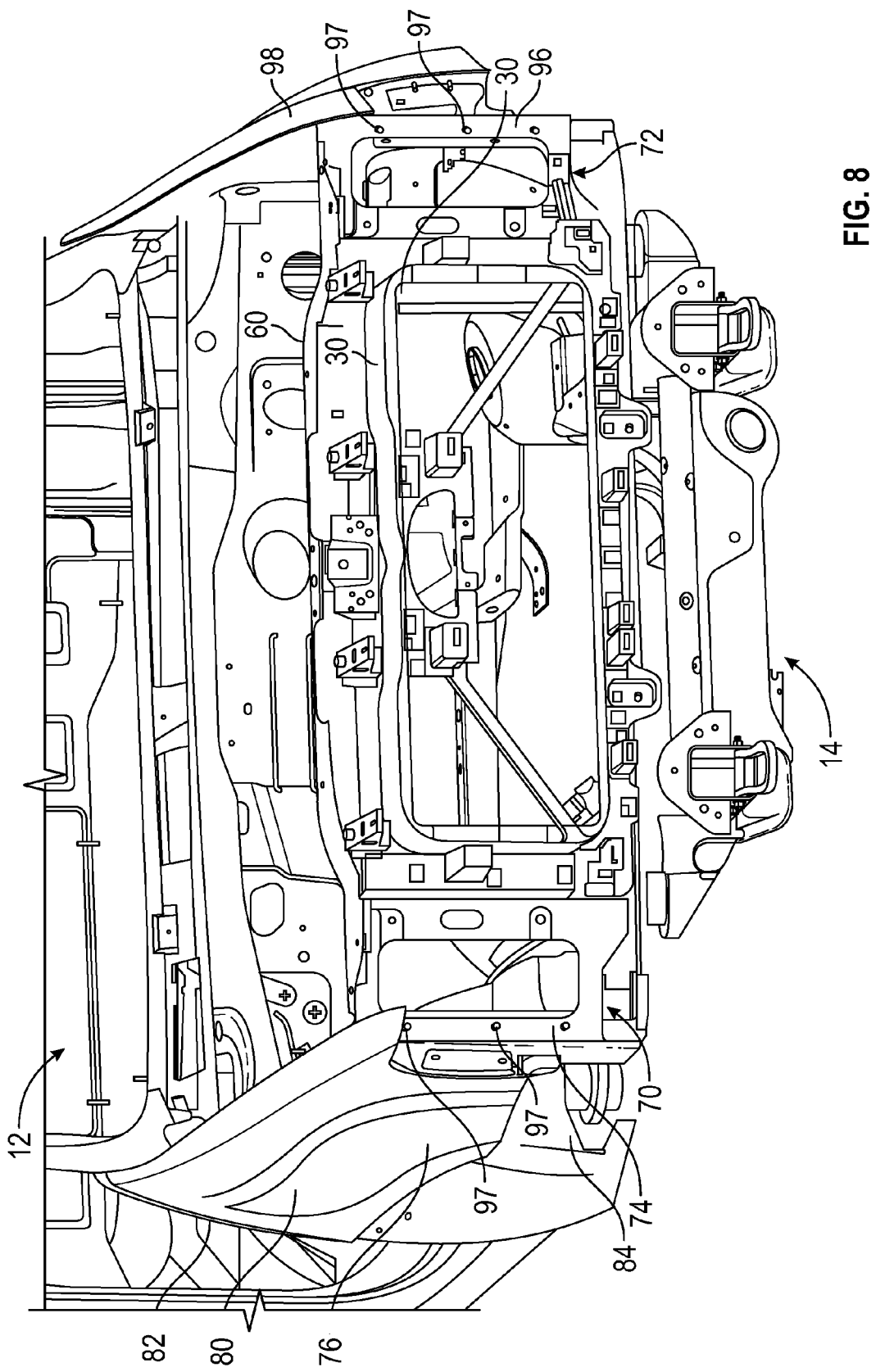
FIG. 8 is a perspective view of the fender assembly operably coupled to the radiator support and the positioning and reinforcement structure.
Figure 9:
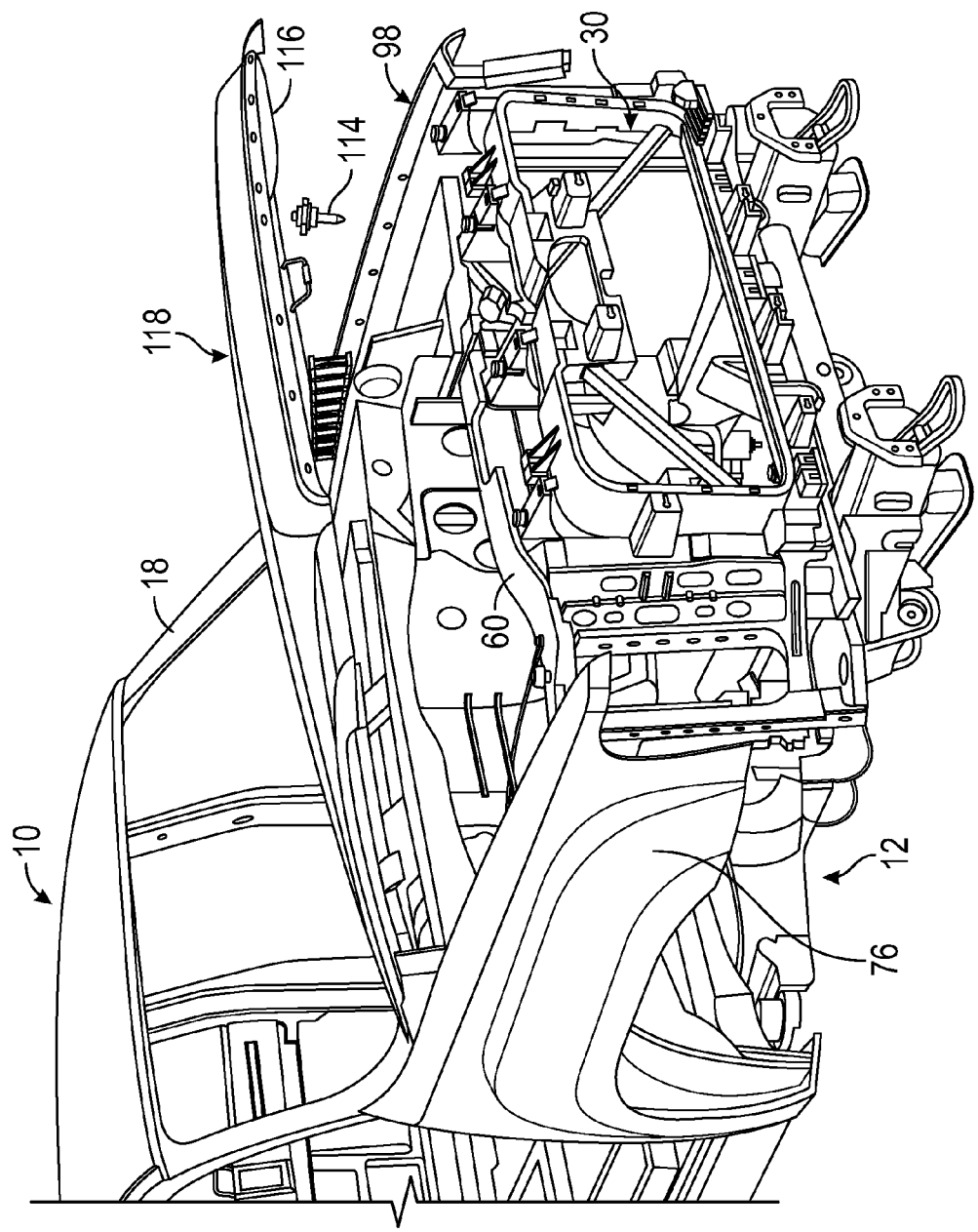
FIG. 9 is a perspective view of the hood disposed proximate the positioning and reinforcement structure.
Figure 10:
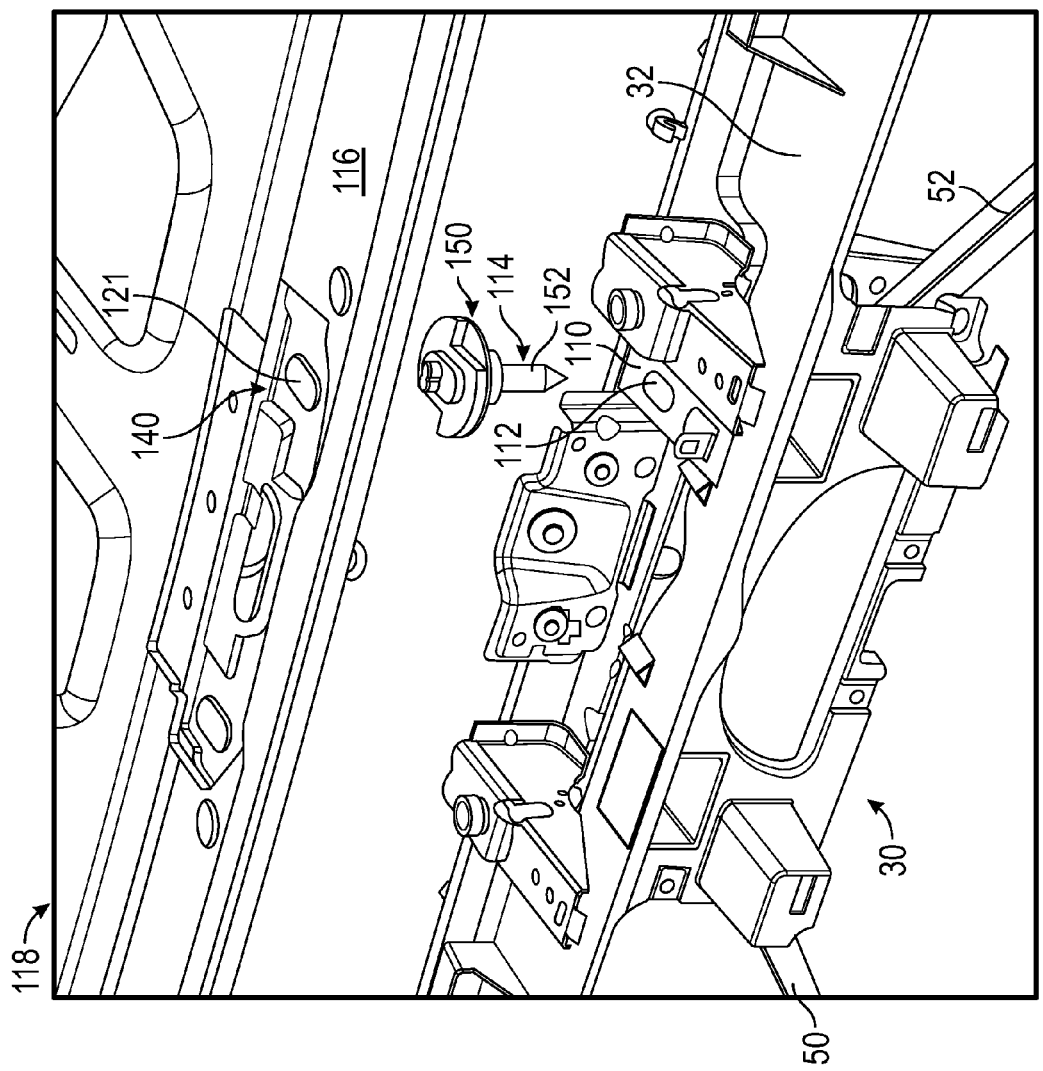
FIG. 10 is a perspective view of the hood prior to locating the hood relative to the positioning and reinforcement structure.
Figure 11:
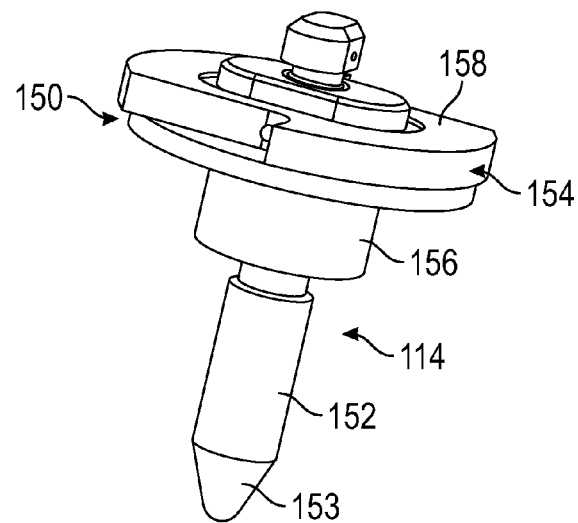
FIG. 11 is a perspective view of a centering tool.
Figure 12:
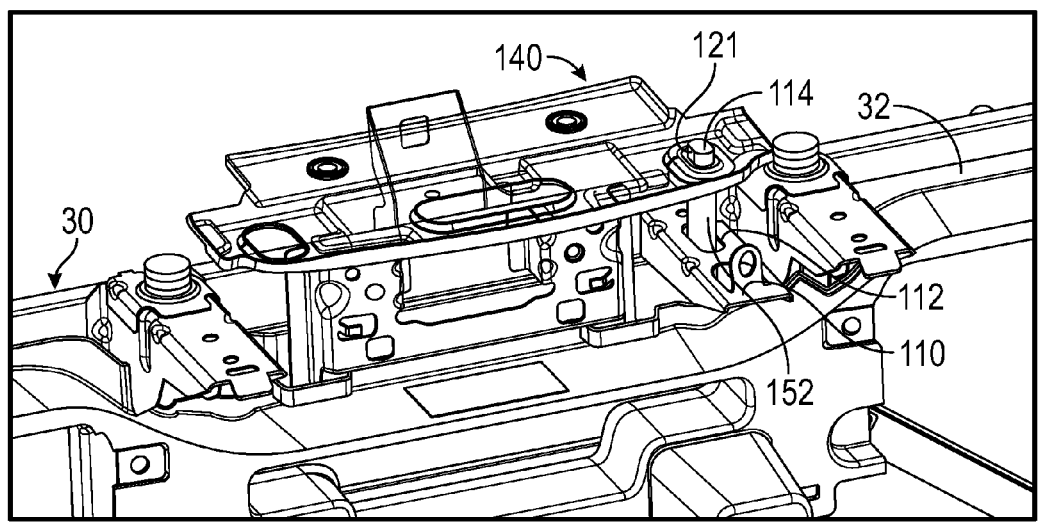
FIG. 12 is a perspective view of the centering tool inserted into a centering bracket.

Referring again to FIGS. 2 and 3, as well as FIGS. 7 and 8, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. As will be described below, a second fender assembly 98 is also included and comprises identical components as that of the first fender assembly 76, such that common reference numerals are employed. Additionally, reference to the illustrated embodiments may interchangeably denote components of the first fender assembly 76 and the second fender assembly 98 for purposes of discussion. The first fender assembly 76 and the second fender assembly each include a fender 80 having an aft end 82 and a forward end 84, with the aft end 82 being fixable to a region in close proximity to a front edge 86 of a vehicle door opening.

The forward end 84 of the fender 80 includes a fender flange 92 having one or more apertures 94 for receiving one or more pins 97 extending forwardly from the first side flange 74 of the first wing structure 70, thereby establishing a displaceable relationship between the first fender assembly 76 and the positioning and reinforcement structure 30 and setting the positioning and reinforcement structure 30 in the vertical direction 28 (FIG. 1).

The second wing structure 72 includes a second side flange 96 proximate an outermost location of the second wing structure 72 for fixing the positioning and reinforcement structure 30 to the second fender assembly 98. As noted above, the second fender assembly 98 is a mirror image of the first fender assembly 76 and is disposed at an opposite cross-car location of the vehicle 12, such that detailed description of the second fender assembly 98 is unnecessary, as are associated reference numerals. Similar to the first fender assembly 76, the second fender assembly 98 mounts to a region proximate a front edge 86 of a vehicle door opening and a displaceable relationship between the second fender assembly 98 and the positioning and reinforcement structure 30 is established by disposal of the fender flange 92 over at least one pin 97 of the second side flange 96.

The first fender assembly 76 and the second fender assembly 98 are each attached to the radiator support 60 with one or more mechanical fasteners, such as shoulder bolts, extending through at least one location proximate the first side flange 74 and the second side flange 96 of the first wing structure 70 and the second wing structure 72, respectively, the mechanical fasteners further extending through corresponding receiving apertures 73 (FIG. 5) disposed in the radiator support 60. The mechanical fasteners may comprise a threaded fastener, such as a shoulder bolt, which draws the radiator support 60 forwardly to an aft surface of the positioning and reinforcement structure 30, thereby establishing a fore-aft plane that the radiator support 60 and the positioning and reinforcement structure 30 are located in. Specifically, the first fender assembly 76 and the second fender assembly 98 determine the fore-aft location of the radiator support 60 and the positioning and reinforcement structure 30 upon engagement of the first fender assembly 76 and the second fender assembly 98 with the positioning and reinforcement structure 30 and the radiator support 60. As described above, the radiator support 60 has a loose fitting relationship with the positioning and reinforcement structure 30 during at least a portion of the assembly, and a slipping relationship between the radiator support 60 and the positioning and reinforcement structure 30 in the cross-car direction 27 (FIG. 1) and the up-down direction is maintained subsequent to establishing the fore-aft location.

Referring now to FIGS. 9-12, a hood 118 is pivotably connected to the vehicle 12 proximate the A-pillar 18. A centering tool 114 is installed proximate a front region of an underside 116 of the hood 118 within a retaining recess 121. The retaining recess 121 is formed within a hood latch-striker reinforcement plate 140 that is operably coupled to the underside 116 of the hood 118. For clarity, the hood latch-striker reinforcement plate 140 is floating in FIG. 12. The hood latch-striker reinforcement plate 140 is employed to facilitate location and securement of one or more latch assembly components (not illustrated), while also having the retaining recess 121 configured to receive a portion of the centering tool 114.

The centering tool 114 includes a base portion 150 and a pin portion 152, which may be operably coupled or integrally formed. The base portion 150 is formed of one or more portions and in the exemplary embodiment includes a first portion 154 and a second portion 156. The first portion 154 and the second portion 156 may be integrally formed or may be separate operably coupled portions. Furthermore, the first portion 154 and the second portion 156 may be formed of distinct or similar materials. Irrespective of the precise configuration of the base portion 150, the pin portion 152 extends downwardly away from the base portion 150 and in the exemplary embodiment the pin portion 152 extends centrally through the base portion 150 to extend outwardly from a top side 158 of the first portion 154.

To facilitate installation of the centering tool 114 into the retaining recess 121, the top side 158 of the base portion 150, and more specifically the first portion 154 in the exemplary embodiment, may include one or more contours and or recesses to assist an installation operator with location of the centering tool 114 relative to the retaining recess 121. Upon insertion of the centering tool 114 into the retaining recess 121, rotation of the centering tool 114 locks the centering tool 114 into place. Numerous degrees of rotation are contemplated and may be modified based on the shape and geometry of the centering tool 114, but in one embodiment a 90° rotation is employed, for example. Upon locking of the centering tool 114 in the retaining recess 121, the pin portion 152 rigidly extends downwardly from the underside 116 of the hood 118.

Disposed in a securely fixed manner proximate the top support member 32 of the positioning and reinforcement structure 30 is a centering bracket 110 that includes a hood locating aperture 112 configured to receive the centering tool 114 operably connected to, and extending downward from, the underside 116 of the hood 118, and more specifically the pin portion 152 of the centering tool 114. The pin portion 152 includes a tapered region 153 comprising an angled geometry that narrows toward the downward-most location of the pin portion 152. The tapered region 153 assists with insertion of the centering tool 114 into the hood locating aperture 112 as the centering tool 114 is lowered into close proximity with the hood locating aperture 112, thereby avoiding an abrupt shifting or impact of the components. Upon insertion of the centering tool 114 into the hood locating aperture 112, a fixed relationship between the hood 118 and the positioning and reinforcement structure 30 is established in the cross-car direction 27 (FIG. 1), such that cross-car movement of either the positioning and reinforcement structure 30 or the hood 118 results in a corresponding cross-car movement of the other component. Although the centering tool 114 is illustrated and described above as being operably connected to the hood 118, it is contemplated that the centering pin 114 is coupled to, and extends upward from, the centering bracket 110, with the hood locating aperture 112 being disposed within the underside 116 of the hood 118. Subsequent to fixing the positioning and reinforcement structure 30 in a desired position, namely centered with respect to the hood 118, the centering tool 114 may be removed from the retaining recess 121. It is also contemplated that the pin portion 152 may simply be removed in a detachable manner from the base portion 150.

As noted above, and as will be further apparent from the following description, the centering bracket 110 is employed to locate and secure one or more components relative to one another to provide a desired dimensional and structural configuration. In one embodiment, the centering bracket 110 provides a datum reference location that several components of the front end assembly 10 are directly or indirectly positioned relative to. Such an embodiment provides a single common locating feature, thereby reducing the tolerance stack-up that commonly persists in front end assemblies requiring a plurality of locating features manufactured independent of each other.

Although it is contemplated that final, tight-fitting securement between the positioning and reinforcement structure 30 and the radiator support 60 may be established at various points during assembly of the front end assembly 10, an exemplary embodiment includes final mechanical fastening subsequent to establishing the fixed cross-car relationship between the hood 118 and the positioning and reinforcement structure 30. The tight-fitting relationship between the positioning and reinforcement structure 30 and the radiator support 60 sets desired gap spacing between the hood 118 and the first fender assembly 76 and the second fender assembly 98.

Figure 13:
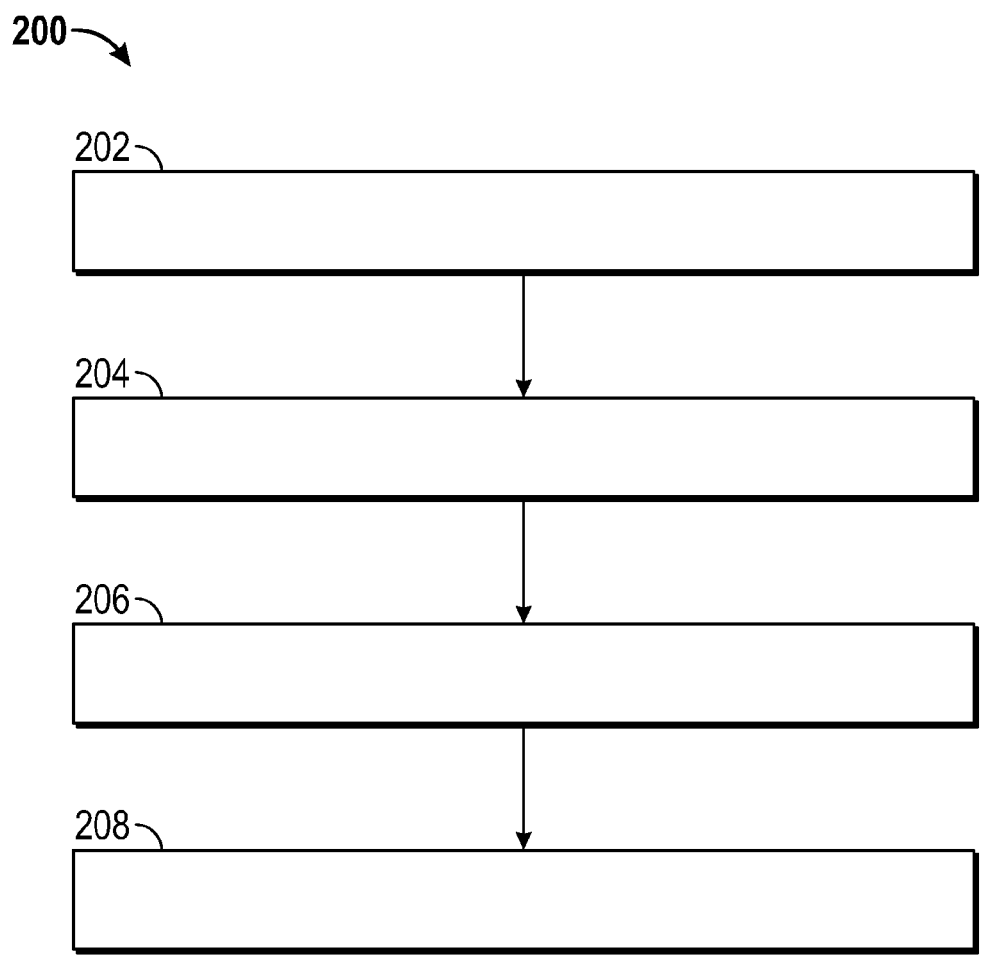
FIG. 13 is a flow diagram illustrating a method of aligning a plurality of front end assembly components.
Figure 14:
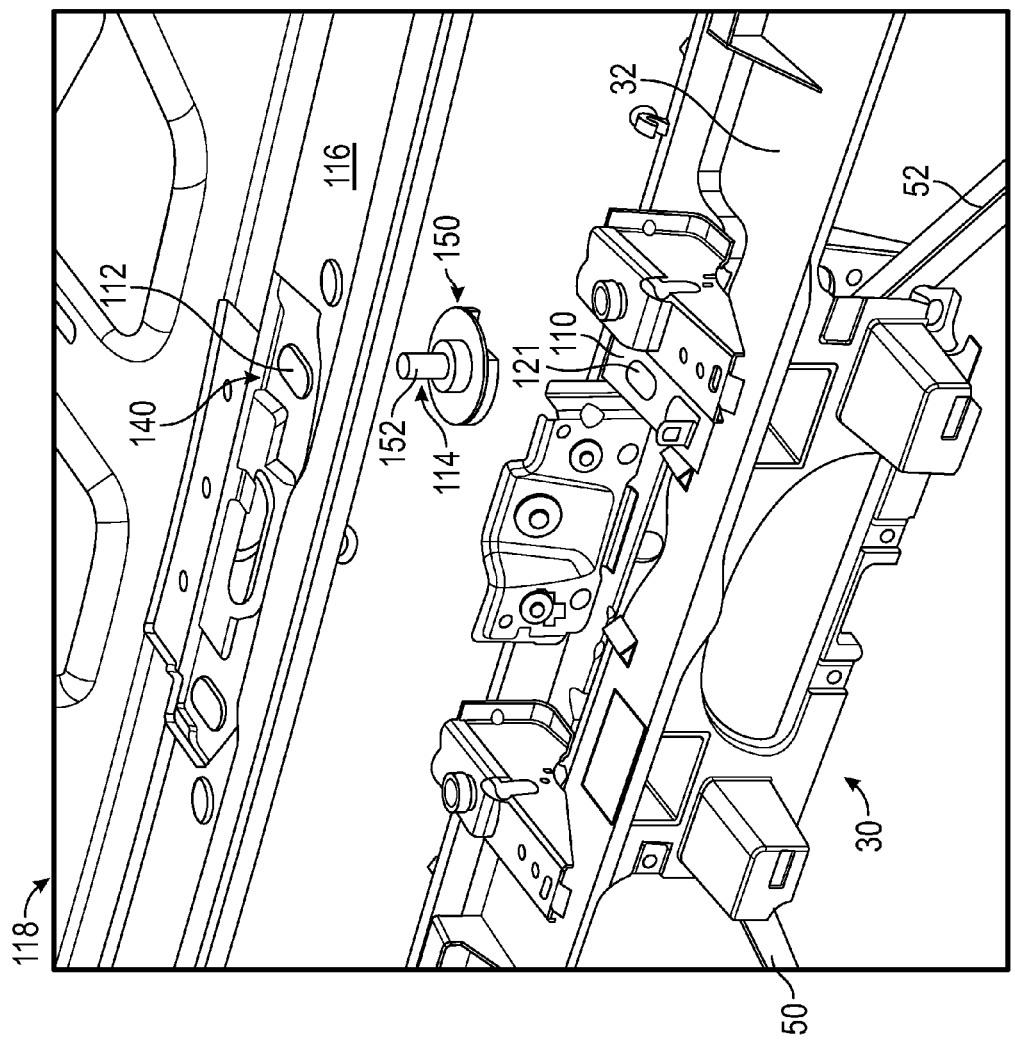
FIG. 14 is a perspective view of the hood prior to locating the hood relative to the positioning and reinforcement structure illustrating an upwardly extending centering tool.

A method of assembling a front end assembly of a vehicle 200 is also provided as illustrated in FIG. 13 and with reference to FIGS. 1-12. The vehicle 12, and more specifically the front end assembly 10 have been previously described and specific structural components need not be described in further detail. The method of assembling a front end assembly of a vehicle 100 includes disposing 202 at least a portion of the centering tool 114 within the retaining recess 121 of the hood latch-striker reinforcement plate 140 that is operably coupled to the underside 116 of the hood 118. The hood is pivoted downwardly 204 to bring the centering tool 114 proximate the centering bracket 110 operably coupled to the top support member 32. The hood locating aperture 112 is aligned 206 with the downwardly extending pin portion 152 and the hood 118 is pivoted downwardly 208 to insert the centering tool 114 into the hood locating aperture 112 for fixing the positioning and reinforcement structure 30 in a cross-car direction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A hood assembly for a vehicle comprising:
    a hood having a top side and an underside;
    a centering tool operatively coupled to a top support member of a positioning and reinforcement structure, the centering tool extending upwardly from the positioning and reinforcement structure; and
    a hood locating aperture defined by the hood and located at the underside of the hood, the hood locating aperture configured to receive the centering tool therein for locating the positioning and reinforcement structure to the hood.

2. The hood assembly of claim 1, the centering tool comprising a base portion and a pin portion extending away from the base portion.

3. The hood assembly of claim 2, wherein the pin portion is detachable from the base portion.

4. The hood assembly of claim 2, wherein the pin portion and the base portion are integrally formed.

5. The hood assembly of claim 1, wherein the centering tool comprises a first end operatively coupled to the positioning and reinforcement structure and a second end located distally therefrom, wherein the second end comprises a blunt end.

6. The hood assembly of claim 1, wherein the positioning and reinforcement structure is centered relative to the hood upon insertion of the centering tool into the hood locating aperture.

7. The hood assembly of claim 6, wherein the positioning and reinforcement structure comprises a plurality of locating and securing components for a plurality of front end assembly components.

8. The hood assembly of claim 7, wherein the positioning and reinforcement structure provides a datum reference point for the plurality of front end assembly components.

9. The hood assembly of claim 1, wherein the positioning and reinforcement structure is fixed in a cross-car direction upon insertion of the centering tool into the hood locating aperture.

10. A method of aligning a plurality of front end assembly components for a vehicle comprising:
    operatively coupling a centering tool to a top support member of a positioning and reinforcement structure to orient the centering tool in an upwardly disposed manner;
    pivoting a hood downwardly to bring a hood locating aperture proximate the centering tool, wherein the hood locating aperture is defined by an inner panel of the hood at an underside of the hood;

aligning the hood locating aperture with the upwardly extending centering tool; and pivoting the hood further downwardly to insert the centering tool into the hood locating aperture for fixing the positioning and reinforcement structure in a cross-car direction.

11. The method of claim 10, further comprising removing at least a portion of the centering tool subsequent to fixing the positioning and reinforcement structure in a cross-car direction.

12. The method of claim 10, wherein fixing the positioning and reinforcement structure in the cross-car direction centers the positioning and reinforcement structure relative to the hood.

13. The method of claim 10, further comprising locating an aligning a plurality of front end assembly components relative to the positioning and reinforcement structure.

14. The method of claim 13, further comprising providing a datum reference point for the plurality of front end assembly components with the positioning and reinforcement structure.

15. The method of claim 10, wherein aligning the hood locating aperture comprises displacing the positioning and reinforcement structure relative to a radiator support disposed proximate an aft surface of the positioning and reinforcement structure.

* * * * *